June 14, 1960  J. DRABIK ET AL  2,940,468
DIAPHRAGM-CONTROLLED GAS PRESSURE REGULATOR
Filed March 5, 1956  3 Sheets-Sheet 2

INVENTORS:
JOSEF DRABIK and
KARL H. SCHWARZ
BY Jones, Tisch & Darbo
Attys

INVENTORS:
JOSEF DRABIK
KARL H. SCHWARZ

United States Patent Office 2,940,468
Patented June 14, 1960

2,940,468

DIAPHRAGM-CONTROLLED GAS PRESSURE REGULATOR

Josef Drabik, near Osnabruck, Germany, and Karl H. Schwarz, Chicago, Ill., assignors to G. Kromschroder Aktiengesellschaft, Osnabruck, Germany Filed Mar. 5, 1956, Ser. No. 569,374

18 Claims. (Cl. 137—461)

This invention relates to a diaphragm-controlled gas-pressure regulator, particularly for medium pressures.

It is known in the art to effect such regulation in two steps and consequently to provide two regulating valves which are arranged in series.

It is also sometimes necessary to provide, in addition to the simple regulating valve or valves, a safety valve or similar device. Such regulators heretofore with several valves arranged in series are generally of rather complicated design and have a relatively long gas passage, thereby resulting in a rather considerable resistance to flow.

The present invention has for its principal object the provision of a concentric structural arrangement of such a gas-pressure regulator provided with a plurality of valving means that can be easily manufactured at a minimum cost and that will afford enhanced safety and efficiency.

The invention also includes a concentric arrangement of safety valving means and gas deficiency safety mechanism.

In an important aspect, the present invention contemplates a hollow valve seat body which is concentrically arranged in the regulator housing, the hollow body providing therethrough a gas entry duct and forming with the wall of the housing a gas exit duct, the valve seat body carrying two valve seats, one interiorly and the other exteriorly thereof which act together with the two valve members respectively, the valve members also being arranged concentrically relatively to each other and to the valve seat body and being controlled by diaphragm means acting independently for each valve.

Such an arrangement has the advantage of resulting in a relatively short gas passage permitting considerable simplification in design and manufacture, since axially symmetrical parts may be used.

These and other objects and advantages will be apparent from the invention which will be understood by reference to the following detailed description of illustrative embodiments thereof, taken together with the accompanying drawings, in which drawings.

Figure 1:
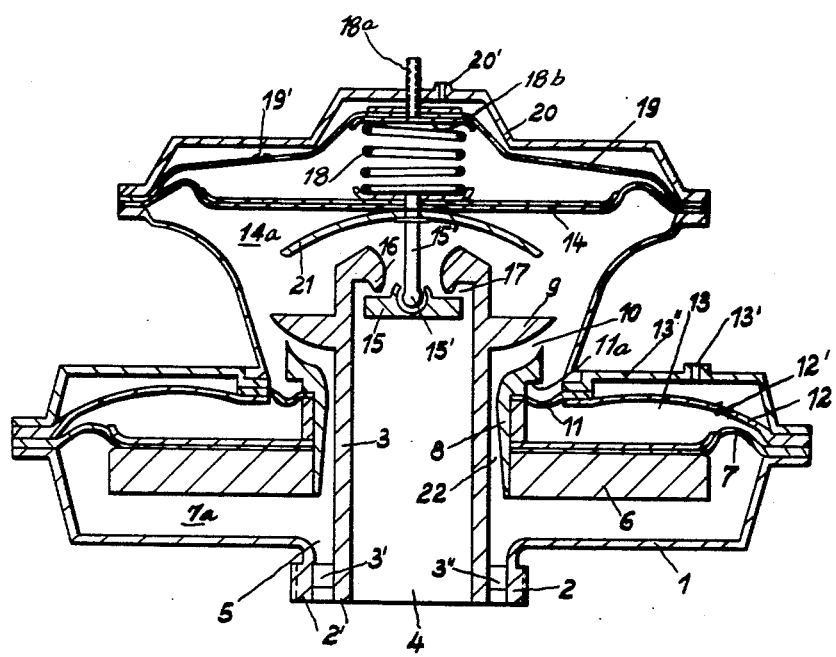
Figure 1 shows a simple two stage gas pressure regulator, with separate diaphragms, following the present invention.

Referring in detail to the illustrative embodiments shown in the drawing, and turning first to Fig. 1, the numeral 1 indicates a regulator housing providing a concentric connection snout 2 that includes a hollow valve seat body 3 inserted into the housing 1 and held therein by bridge members 3', 3'' that space the hollow valve seat body 3 from the wall of the housing to provide a gas entry duct 4 thereinto and a gas exit duct 5 between the regulator housing 1 and the valve seat body 3. In the housing 1 is peripherally secured a working diaphragm 7 that is loaded by a weight 6 in the form of an annulus on the lower face of the diaphragm 7 that surrounds but is spaced from the hollow valve seat body 3, the diaphragm carrying an exterior or outside valve member 8 that cooperates with an annular valve seat 9 here shown in the form of the flange-like part on the exterior of the valve seat body 3. Thus a regulatable throttling slot 10 is provided between the valve seat 9 and the valve member 8, the latter being further supported by a compensating diaphragm 11 which at its periphery is fixed to the regulator housing 1. Between the place where the diaphragm 11 is fixed to the housing and the place where the diaphragm 7 is fixed to the housing there is a safety diaphragm 12 having a small opening 12' therein. There is thus provided a space 13 above the working diaphragm 7 and below the compensating diaphragm 11 and the safety diaphragm 12, and this space is in communication with the outside atmosphere through the small opening 12' in the diaphragm 12 and a breather opening 13' in the upper face 13'' of the housing.

Above the tubular valve seat body 3 is another working diaphragm 14 peripherally secured in the housing 1 and carrying at its center an interior or inside valve member 15 which is within the valve seat body 3 and is connected by a ball joint 15' with a valve stem 15'' through the intermediation of which the working diaphragm 14 carries the valve member 15. The valve member 15 is below and cooperates with an internal annular valve seat 16 formed on the inside of the valve seat body 3. That is, when the valve stem 15'' is depressed, the valve member 15 is in open position and another regulatable throttling slot 17 is provided between the valve member 15 and the valve seat 16. The diaphragm 14 is loaded by a compression coil spring 18, the force of which can be regulated from the outside of the housing in any suitable manner, as by means of a threaded stem 18a which is connected to, or bears against the spring plate 18b.

The numeral 19 designates another safety diaphragm which is between the diaphragm 14 and the housing cover 20, the diaphragm 19 having a small opening 19' therethrough and cover 20 having a breather aperture 20'. A curved baffle sheet 21 carried by the valve stem 15'' may be employed to deflect the gas stream emerging from the throttling slot 7 toward the throttling slot 10.

It will be seen that gas entering the duct 4 from its lower end is first regulated to an intermediate pressure by means of the inner valving means 15, 16 in control of the throttling slot 17, the value of such pressure depending on the degree of compression in spring 18. If the pressure of the gas in intermediate chamber 14a is such that it exerts a force upon working diaphragm 14 greater than the force of the spring 18, valving means 15, 16 will tend to close the slot 17. As the pressure in this intermediate chamber diminishes, the throttling slot 17 is increased in size by action of the spring to permit increased flow of gas therethrough. A second reduction in pressure is effected by the outside regulating valving means 8, 9, in control of the throttling slot 10, to the desired final pressure in discharge chamber 7a.

A restricted venturi-shaped gas passageway 22 is defined by the tubular-shaped valve member 8 and the outside wall of valve seat body 3. Due to the limited cross-section of this passageway, the velocity of the gases flowing therethrough is correspondingly high and the static pressure at the outlet of the passageway correspondingly low. Since the end of this restricted passageway is in direct communication with chamber 7a, the result is to counteract and compensate for the normal "diminution regulator characteristics" which, except for the diminished static pressure at the outlet of the restricted passageway as described, would result in a diminution of pressure at the discharge of the regulator with increasing rate of flow of gas through the regulator. The discharge pressure, as so compensated, is more nearly constant.

The area of diaphragm 11 is approximately twice that of the overhanging shoulder 11a of the valve member 8 whereby the extraneous effect of the downward pressure of the gas upon the former is neutralized by the upward pressure upon the latter.

Figure 2:
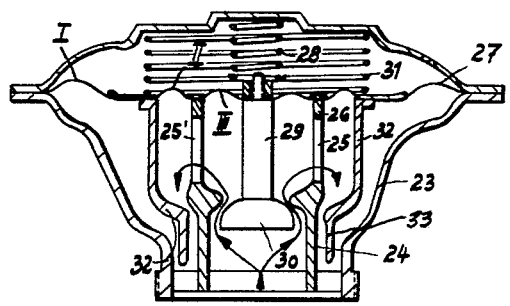
Figure 2 shows a modification in which the diaphragm means is subdivided.

In the embodiment shown in Fig. 2, a tubular valve seat body 24 is mounted in the regulator housing 23 to provide an arrangement similar to that of Fig. 1. This valve seat body, however, carries an extension 26 provided with openings 25, 25'. A diaphragm 27 fixed to the housing 23 at its periphery is also fixed to the upper rim of extension 26 of the valve seat body. The diaphragm 27 carries the shaft 29 of the inside valve body 30 at its center, which shaft is loaded by a spring 28. A cup-shaped outside valve member 32 is attached to the diaphragm 27 for movement therewith, this portion of the diaphragm being loaded by a spring 31. In this manner three ring sections, I, II, III of the diaphragm 27 are formed, of which the outer one (I) acts as a working diaphragm for the outside valve member 32 and the inner one (III) as a working diaphragm for the inside valve member 29, 30. The intermediate ring section (II) of the diaphragm 27 has the function of a supporting and compensating diaphragm for the outside valve member 32. The valve members 30 and 32 act in the manner already described in conjunction with the inside and outside valve seats, respectively, of the valve seat body 24 so that the gas entering from below is first regulated to an intermediate pressure by the inside regulating valve 30 and then to the final pressure after passing the openings 25, 25' by means of the outside regulating valve 32. A collar 33 arranged on the outside valve body 32 serves also in this case to define a restricted passageway, similar to passageway 22 of the device of Fig. 1, whereby the normal "diminution regulator characteristic" is counteracted, as more fully described above, to apply a pressure condition to working diaphragm 27 which will result in more constant regulator discharge pressure. The value of the intermediate pressure is determined by the spring 28 while the exit pressure depends on the load spring 31.

The arrangements shown can find analogous application with one-stage or two-stage gas pressure regulators, where e.g. an inside valve body can form together with the inside valve seat a safety check valve operating in case of over pressure.

Figure 3:
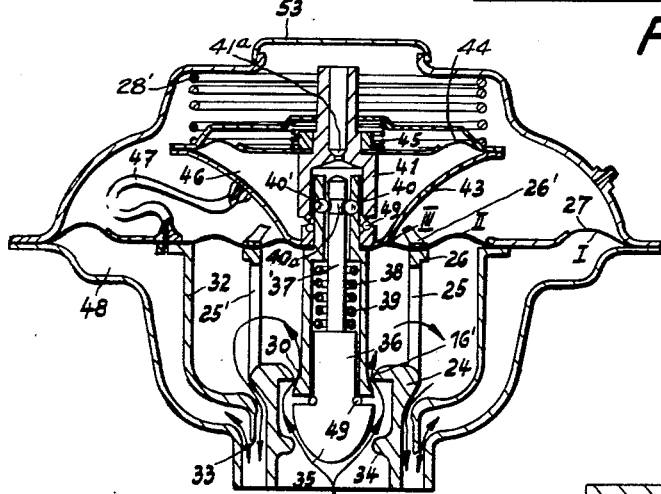
Figure 3 shows a further modification incorporating a safety valve.

Figure 3 shows an embodiment of the regulator corresponding in design and operation to that of the regulator shown in Fig. 2. In this case, however, a safety valve is provided additionally that cuts off the gas entry in case of excessive pressure developing at the regulator outlet. An additional valve seat 34 is provided in the inside of valve seat body 24 for the safety valve, and this valve seat 34 acts together with a safety valve body or plug 35. The shaft 37 with the collar 36 of the safety valve body 35 is axially guided in a sleeve 38. A compression spring 39 bears on the one hand against the collar 36 and on the other hand against a shoulder in the guide piece 38 and therefore tries to press the safety valve body 35 and also the regulating valve body onto their respective valve seats 34 and 16'. The valve shaft 37, however, is coupled through coupling balls 40, 40' and circumferential groove 40a to the guide part 38 when the safety valve 34, 35 is open. A retaining jacket 41 holds the balls normally in coupling position and has in its lower part an enlarged counterbore 42 for the reception of the coupling balls 40, 40' upon actuation of the safety device.

Through dogs 26', the extension 26 is designed as a stop in its upper part. This stop insures that the safety valve body 35 does not prematurely descend on the valve seat 34 as when the pressure regulator is attached or in case of lack of gas, the initial pressure would otherwise not be able to lift the valve body 35 and the movable parts suspended on it.

The guide part 38 is supported by section III of diaphragm 27 and carries the entire assembly including safety mechanism housing 43 within which an overpressure diaphragm 44 is fixed. The overpressure diaphragm 44 is loaded by an additional spring 45 and is connected with the retaining jacket 41.

The overpressure space 46 surrounded by the housing 43 is connected to the back pressure space 48 of the regulator by a flexible tube connection 47. A load spring 28' corresponds to the load spring 28 of Fig. 2 and acts from the outside on the housing 43.

In case of normal regulating action of the valve element 30, the whole system (35—46) of the safety valve is suspended and carried by section III of the working diaphragm 27. If, however, an overpressure arises in the back pressure space 48 of the regulator and therefore also in the overpressure space 46, and if such pressure is high enough to overcome the action of spring 45, the overpressure diaphragm 44 lifts the retaining jacket 41 high enough to let the coupling balls 40, 40' move out into the counterbore 42 and to release the valve spindle 37 which is under the influence of the closing spring 39. The safety valve body 35 is thereupon pressed down onto its seat 34 and, at the same time, the regulating valve element 30 is pressed onto the seat 16' by the reaction of closing spring 39. Previously to this, however, the sealed joint formed by the soft rubber ring 49 is lifted by the retaining jacket 41, so that a limited overpressure existing in the safety housing space 46 can dissipate itself by leakage between the guide piece 38 and the retaining jacket 41. Only when such a gradual pressure dissipation does not suffice to release the overpressure, release of the coupling is effected as described above. If desired, the rate of dissipation of overpressure can be controlled by the size of the orifice 41a.

Figure 4:
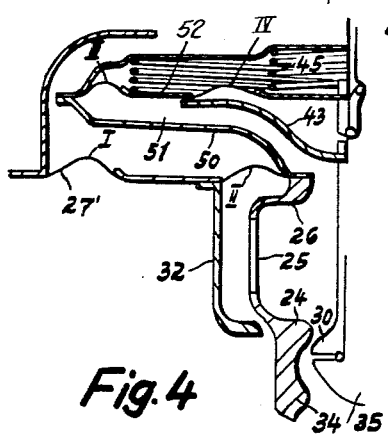
Figure 4 is a fragmentary view of a structure somewhat similar to that of Figure 3, further modified.

In Fig. 4, in deviation from the embodiment shown in Fig. 3, only a diaphragm 27' is provided forming the ring sections I and II for the outside valve body 32, instead of a diaphragm 27 that acts on three ring sections I, II, III. In place of section III of the diaphragm 27, there is a second diaphragm 52 fixed to an intermediate element 50, defining the intermediate pressure space 51, which diaphragm 52 forms two ring sections III and IV. The diaphragm 52 supports the intermediate element 43. The ring section III forms the working diaphragm for the inside valve element 30, whereas the ring section IV acts as the overpressure safety diaphragm.

Figure 5:
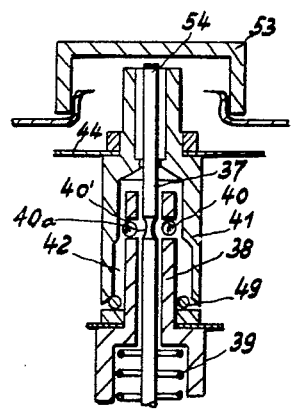
Figure 5 is an enlarged view of the coupling of the safety valve shaft with the regulator valve shown also in Figure 3.

The cover of the regulator housing is fitted with an easily detachable center piece 53 made of transparent plastic material. As shown in Fig. 5, the shaft 37 of the safety valve and the retaining jacket 41 are extended in upward direction so that their front faces are located closely under the cover piece 53. The head 54 of the valve shaft 37 is constructed as a visual signal by means, for example, of red paint. It is therefore possible to see through the cover piece 53 whether the valve shaft 37 is in its top position, i.e. in coupling position, or in its lower position, i.e. closed. After taking off the cover piece 53, the retaining jacket 41 can be reached from above, so that the coupling between the valve shaft 37 and the guide part 38 can be reestablished after relieving the overpressure, coupling being effected by simply pushing in the retaining jacket 41.

Although not illustrated in Fig. 4, it will be understood that a tubular extension, similar to collar 33 of Fig. 2, may be provided, if desired, at the bottom of valve body 32 to provide a restricted passageway toward the discharge of the regulator for purposes above described.

Figure 6:
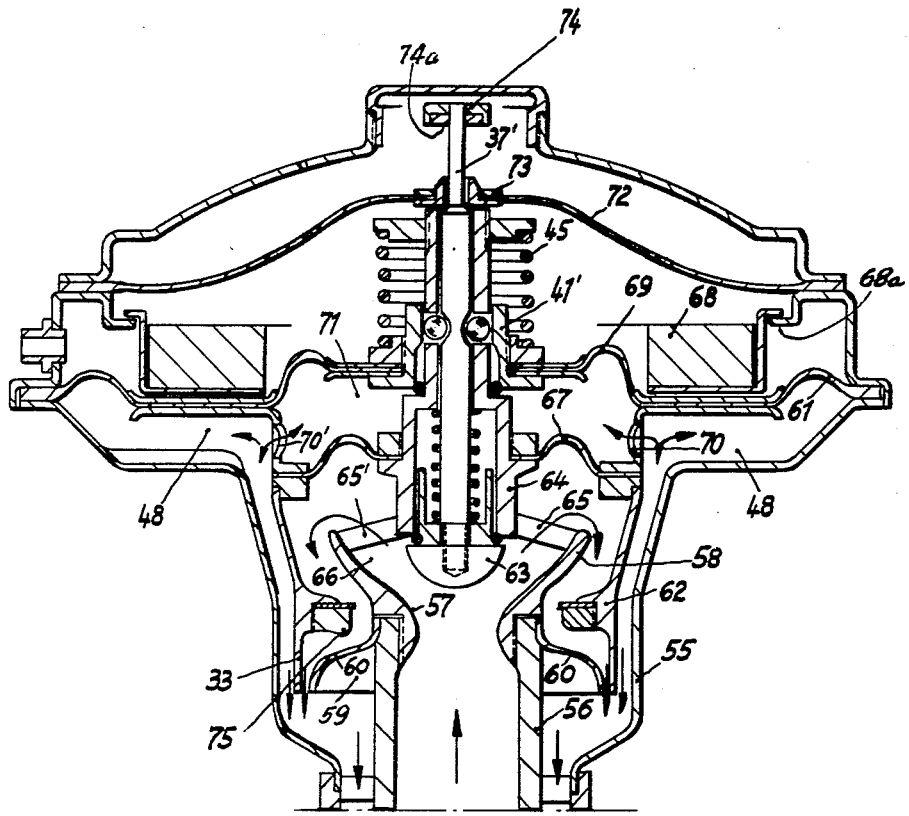
Figure 6 shows a form including a safety valve and a gas deficiency safety mechanism.

The embodiment shown in Fig. 6 represents a one-stage regulator with an overpressure safety valve and gas underpressure safety device. A valve seat body 56 is concentrically inserted into the regulator housing in the manner described above, the valve seat body 56 being fitted with an inside valve seat 57 and an outside valve seat 58. Another outside valve seat 60 is formed by a bell-shaped sheet metal part 59 that is attached on the outside of the valve seat body 56. An annular valve element 62, which is fixed to a working diaphragm 61, operates in cooperation with valve seats 58 and 60. The valve element 62 forms a regulating valve together with the valve seat 58, and a gas underpressure check valve together with the valve seat 60.

In addition, it is also possible to improve the regulating characteristic by extending the sheet metal part 59 to cooperate with the corresponding collar extension 33 of the valve body 62 to provide the desired restricted passageway between these parts with the effect above described.

The inside valve seat 57 is provided for the safety valve plug 63. The guide piece 64 for the safety valve 63 is fixed to the valve seat body 56 by webs or bridge members 65, 65' spanning the gas entry duct 66. A compensating diaphragm 67 is fixed to the guide piece 64 on the one hand and to the valve body 62 on the other hand.

The working diaphragm 61 is loaded by a weight 68 and is connected at its inner side with the retaining jacket 41' of a ball-type coupling already described. An inside annular section 69 of the working diaphragm 61 forms the overpressure diaphragm which is independently loaded by a spring 45. The valve body 62 has lateral gas passages 70, 70' above the compensating diaphragm 67 so that the overpressure space 71 has connection with the back pressure space 48 of the regulator. A safety diaphragm 72, carrying a centrally arranged bushing 73, is disposed above the working diaphragm 61 in the regulator housing 55. The shaft 37' of the safety valve 63 passes through the bushing 73, limited clearance being provided for the controlled passage of gas to dissipate small overpressure in the manner above described. At its upper end shaft 37' carries a valve disc 74 which simultaneously serves as a visual mark. A resilient body 74a may be provided at the under surface of disc 74.

With the safety valve 57, 63 open, the incoming gas is regulated in the manner hereinbefore described, to a pressure determined by the weight 68, by the regulating valve 58, 62. In the event of lack of gas supply, the valve body 62 seats upon the valve seat 60 and closes the gas exit. In order to put the valve body 62 again into regulating position when the lack of gas supply has been remedied, a small notch 75 is provided at the seating edge of valve body 62 so as to permit a small leakage which reestablishes normal relationships, provided no gas is withdrawn. It will be noted that weight 68 is operative to load working diaphragm only during normal operation of the regulator, ledge 68a serving to support this weight when the gas pressure falls to the point at which the underpressure safety device comes into play.

When there is overpressure in the back pressure space 48, and therefore also in the overpressure space 71, the overpressure diaphragm 69 releases the ball-type coupling and the safety valve 57, 63 closes. At the time, however, the valve disc 74 closes the opening of the bushing 73 so that a complete seal against the open air is obtained.

Invention is claimed as follows:

1. A gas control valve with pressure regulation comprising a housing having an axial opening therein at one end thereof, an open-ended tubular valve seat body mounted within said housing to form a gas inlet duct and passing through said opening to provide an annular gas exit passageway between said valve seat body and said housing, a first valve mechanism including a first annular seat within said valve seat body and a first movable valve member operatively associated with said first seat and a first diaphragm controlling said first valve member, and a second valve mechanism including a second seat encircling the exterior of said valve seat body and a second movable valve member operatively associated with the downstream side of said second seat and a second diaphragm in controlling connection with said second valve member, said second diaphragm and valve member being biased toward open position of said second valve mechanism and exposed and responsive to a pressure condition at the downstream side of the second valve mechanism to actuate said second valve mechanism in closing or opening directions, as this pressure varies above or below the value required to overcome said bias.

2. A gas control valve in accordance with claim 1 wherein the first annular seat is located near the inner extremity of the valve seat body and faces into said body, the first movable valve member including a valve plug adapted to seat upon said first annular seat and biased in an opening direction and a valve stem extending through said first annular seat and connecting said plug with the first diaphragm, the diaphragm being responsive to pressure between the valve seats for moving said plug towards or away from its seat depending on whether this pressure is high enough to overcome the bias of said valve plug.

3. A gas control valve in accordance with claim 1 wherein the second movable valve member comprises a generally tubular element surrounding the tubular valve seat body in spaced relation thereto to provide a restricted passageway between said second movable valve member and said valve seat body, said tubular element terminating short of the gas exit passageway to terminate said restricted passageway within the housing to produce a jet having its side exposed to and determining the pressure in the space in which the specified pressure condition exists whereby to tend to diminish the magnitude of said second pressure condition with increasing rate of flow of gas through the regulator.

4. A gas control valve in accordance with claim 3 wherein the second diaphragm is attached to the second movable valve member near the downstream end thereof and a third diaphragm is attached to said second movable valve member near the opposite end thereof to aid in the support thereof, the upstream extremity of said second movable valve member being flanged outwardly on the upstream side of said third diaphragm and exposed in the upstream direction to pressure reduced by the second valve member to provide an undersurface for the compensation of pressure exerted against said third diaphragm and said undersurface.

5. A gas control valve in accordance with claim 1 wherein the tubular valve seat body is provided with an extension between the two valve seats having apertures therein for the passage of gas through said apertures, the first diaphragm being peripherally secured to and covering said extension above said apertures, said second movable valve member comprising a cup-shaped element surrounding at least the portion of the tubular valve seat body adjacent said extension and said extension and being secured to the second diaphragm, said second diaphragm extending from said cup-shaped element outwardly to the housing, and including a third diaphragm secured to said extension and extending to said cup-shaped element.

6. A gas control valve in accordance with claim 5 wherein the first, second and third diaphragms comprise a unitary diaphragm element.

7. A gas control valve in accordance with claim 5 wherein the cup-shaped element is provided with a tubular collar surrounding the valve seat body in spaced relation thereto and extending in the downstream direction to provide a restricted passageway, said tubular collar terminating short of the gas exit passageway to terminate said restricted passageway within the housing in direct communication with the space in which the second pressure condition exists whereby to produce a jet having its side exposed to and determining the pressure of the second pressure condition, to tend to diminish the magnitude of said second pressure condition with increasing rate of flow of gas through the regulator.

8. A gas control valve in accordance with claim 1 and including a third valve seat, said third seat being located within the valve seat body below the first seat, and overpressure safety mechanism including a third movable valve element adapted to cooperate with said third valve seat to shut off the flow of gas into the regulator in the event of excessive pressure in the second pressure condition.

9. A gas control valve in accordance with claim 8 wherein the overpressure safety mechanism comprises a tubular guide member which forms the valve stem of the first valve mechanism and has a counterbore extending into one end thereof, said guide member being supported by the first diaphragm, the third movable valve element including a stem slidably disposed within said guide, compression spring means within the counterbore of said guide urging said stem and said guide oppositely in their respective valve closing directions, coupling means in said guide and including movable elements for normally retaining said stem and guide in retracted relationship, an overpressure housing member carried by said guide and extending away from said first diaphragm, a retaining jacket surrounding said guide at said coupling means and normally retaining said movable elements of said coupling means in coupling position, an overpressure diaphragm peripherally secured to said overpressure housing member and centrally fixed to said retaining jacket and forming with said overpressure housing a closed overpressure chamber, and gas connecting means bringing the second pressure condition to bear within said overpressure chamber, said retaining jacket having a counterbore whereby a predetermined movement of said overpressure diaphragm and said jacket releases said movable members of said coupling causing said guide to move to close the first valve mechanism and said third movable valve element to move oppositely to prevent flow of gas at said third valve seat.

10. A gas control valve in accordance with claim 8 wherein the overpressure safety mechanism comprises a tubular guide member which forms the valve stem of the first valve mechanism and has a counterbore extending into one end thereof, said guide member being supported by the first diaphragm, the third movable valve element including a stem slidably disposed within said guide, compression spring means within the counterbore of said guide urging said stem and said guide oppositely in their respective valve closing directions, coupling means in said guide and including movable elements for normally retaining said stem and guide in retracted relationship, an overpressure housing member carried by said guide and extending away from said first diaphragm, a retaining jacket surrounding said guide at said coupling means and normally retaining said movable elements of said coupling means in coupling position, an overpressure diaphragm peripherally secured to said overpressure housing member and centrally fixed to said retaining jacket and forming with said overpressure housing a closed overpressure chamber, and gas connecting means bringing the second pressure condition to bear within said overpressure chamber, means for permitting the bleeding off of gas from said overpressure chamber upon limited upward movement of said overpressure diaphragm and said jacket, said retaining jacket having a counterbore whereby a predetermined movement of said overpressure diaphragm and said jacket releases said movable members of said coupling causing said guide to move to close the first valve mechanism and said third movable valve element to move oppositely to prevent flow of gas at said third valve seat.

11. A gas control valve in accordance with claim 1 wherein the second seat is located near the inner end of the valve seat body and faces outwardly and a third seat is arranged outwardly of said second seat upon the exterior of said valve seat body, said third seat being spaced from said second seat and facing said second seat, said second movable valve member including an annular valve plate adapted to cooperate with said second seat to throttle the flow of gas passing said second seat and alternatively with said third seat to substantially shut off the flow of gas in the event of reduction of gas pressure at the exit passageway of said regulator below a predetermined minimum level.

12. A gas control valve in accordance with claim 11 wherein a permanently open small opening is provided to permit limited bleeding of gas from the space upstream from the third valve seat to the space downstream from said third valve seat.

13. In a gas control valve having a housing with a gas inlet and a gas outlet and including a gas intake duct connected with said gas inlet and a regulator diaphragm mounted on said regulator, an overpressure safety shut-off mechanism comprising an intake valve seat arranged in the gas intake duct of the regulator and facing downstream, a tubular guide mounted in said regulator coaxially with said intake duct and having a counterbore, a movable valve element including a stem slideably arranged within said guide and a valve plug at one end of said stem adapted to cooperate with said seat to shut off the flow of gas into the regulator, compression spring means within the counterbore of said guide urging said movable valve element in the valve closing direction, coupling means at one portion of said guide and including movable elements for normally retaining said stem in retracted relationship in the guide, a retaining jacket surrounding said guide at said coupling means and normally retaining said movable elements of said coupling means in coupling position, a diaphragm exposed to the pressure condition existing at the gas outlet of the regulator and operatively connected at its center with said retaining jacket to move said jacket longitudinally of the guide under the influence of overpressure, said retaining jacket having a counterbore for the reception of said movable elements of said coupling means to uncouple said stem and guide upon predetermined movement of said diaphragm and jacket whereby to cause said movable valve element to move into engagement with said intake valve seat to shut off the flow of gas.

14. Structure in accordance with claim 13 wherein the juncture of the lower extremity of the retaining jacket below the diaphragm with the guide is normally sealed against the passage of gas and means are provided for the limited bleeding off of overpressure gas upon initial and limited opening movement of said jacket opening the normally sealed juncture of jacket and guide.

15. Structure in accordance with claim 14 wherein the valve stem extends beyond the upper end of the guide and the means for bleeding off overpressure gas includes means forming a valve seat surrounding said stem and leaving an annular orifice between said stem and said seat, and a valve plate fixed upon the end of said stem and adapted to engage said seat to close said orifice concurrently with the closing of the gas intake valve upon the uncoupling of the jacket and valve stem.

16. A two-stage diaphragm-controlled gas pressure regulator comprising an axially symmetrical housing having an axial opening therein at one end thereof, an open-ended tubular valve seat body mounted concentrically within said housing to form a gas inlet duct and passing through said opening to provide an annular gas exit passageway between said valve seat body and said housing, a first stage pressure reducing valve mechanism including a first annular seat within said valve seat body and a first movable valve member operatively associated with said first seat and a first diaphragm biased toward open position of said first stage valve mechanism responsive to the intermediate pressure condition downstream from said first stage valve mechanism connected to the first valve member for causing a closing movement of said first valve member when the intermediate pressure is high enough to overcome the bias, and a second stage pressure reducing valve mechanism including a second seat encircling the exterior of said valve seat body and a second movable valve member operatively associated with said second seat and a second diaphragm biased toward open position of said second stage valve mechanism and responsive to the regulator outlet pressure downstream from said second stage valve mechanism connected to the second valve member for causing a closing movement of said second valve member when the outlet pressure is high enough to overcome the bias, said second stage valve mechanism being connected for flow of gas from said first stage valve mechanism thereto and thence to said gas exit passageway.

17. Structure in accordance with claim 13 and including a second valve seat arranged to face the intake valve seat within the intake duct on the downstream side of the intake valve seat, one extremity of the tubular guide being enlarged and located between said intake valve seat and said second valve seat to cooperate therewith to form a regulating valve, said tubular guide being biased in the direction for opening this regulating valve and being mounted in the regulator diaphragm for movement therewith in the regulation of the flow of gas through said regulating valve.

18. A two-stage diaphragm-controlled gas pressure regulator comprising a housing forming a diaphragm chamber open at one side, a tube, having internal and external valve seats, extending into said open side and spaced from the housing to form inflow and outflow ducts, one through the internal valve seat and the other annularly around the external valve seat, a movable valve member for cooperation with each valve seat, each biased to an open position, a diaphragm connected in controlling relationship to each movable valve member at least one of said diaphragms being in said diaphragm chamber and each diaphragm being exposed on one side thereof to pressure on the downstream side of the valve member which it controls and responsive to said pressure to close or open the valve it controls depending on whether the pressure overcomes the bias, one diaphragm controlling the upstream one of the valve members and being exposed to pressure between the two valve seats and the other diaphragm being exposed to pressure downstream beyond both valve seats.

References Cited in the file of this patent
UNITED STATES PATENTS

| | | |
|---|---|---|
| 1,912,383 | Pardee | June 6, 1933 |
| 2,057,150 | Kehl | Oct. 13, 1936 |
| 2,515,252 | Niederer | July 18, 1950 |
| 2,693,823 | Sogge | Nov. 9, 1954 |
| 2,733,729 | Wolfe | Feb. 7, 1956 |
| 2,752,930 | Stouder | July 3, 1956 |

FOREIGN PATENTS

| | | |
|---|---|---|
| 503,127 | Germany | Sept. 5, 1930 |
| 1,111,473 | France | Oct. 26, 1955 |